US00RE44499E

(19) United States
(12) Reissued Patent
Inoue et al.

(10) Patent Number: US RE44,499 E
(45) Date of Reissued Patent: Sep. 17, 2013

(54) FOCUS DETECTION APPARATUS, METHOD OF DRIVING THE SAME AND CAMERA SYSTEM

(75) Inventors: Daisuke Inoue, Ebina (JP); Hidekazu Takahashi, Zama (JP)

(73) Assignee: Canon Kabushiki Kaisha, Tokyo (JP)

(21) Appl. No.: 13/344,087

(22) Filed: Jan. 5, 2012

Related U.S. Patent Documents

Reissue of:
(64) Patent No.: 7,643,743
Issued: Jan. 5, 2010
Appl. No.: 11/751,974
Filed: May 22, 2007

(30) Foreign Application Priority Data

Jun. 30, 2006 (JP) ..... 2006-181670

(51) Int. Cl.
*G03B 3/00* (2006.01)

(52) U.S. Cl.
USPC ..... 396/96

(58) Field of Classification Search
USPC ..... 396/96, 121
See application file for complete search history.

(56) References Cited

U.S. PATENT DOCUMENTS

| | | | | |
|---|---|---|---|---|
| 4,914,282 | A | 4/1990 | Akashi et al. | |
| 5,387,933 | A * | 2/1995 | Fouilloy et al. | 348/294 |
| 5,654,790 | A | 8/1997 | Uchiyama | |
| 5,659,816 | A * | 8/1997 | Uchiyama | 396/124 |
| 5,943,514 | A * | 8/1999 | Sato et al. | 396/96 |
| 6,704,051 | B1 | 3/2004 | Takahashi | 348/315 |
| 6,781,624 | B1 * | 8/2004 | Takahashi | 348/241 |
| 6,803,614 | B2 | 10/2004 | Takahashi | 257/292 |
| 7,164,447 | B2 | 1/2007 | Takahashi | 348/350 |
| 2006/0045506 | A1 | 3/2006 | Takahashi | 396/96 |
| 2006/0177210 | A1 * | 8/2006 | Ichimiya | 396/96 |
| 2007/0047939 | A1 | 3/2007 | Inoue et al. | 396/102 |

(Continued)

FOREIGN PATENT DOCUMENTS

| | | |
|---|---|---|
| JP | 11-191867 | 7/1999 |
| JP | 2005-109370 | 4/2005 |
| JP | 2005-300844 | 10/2005 |

OTHER PUBLICATIONS

Translation of Jul. 18, 2008 Chinese Official Action in Chinese Patent Appln. No. 200710127903.6.

*Primary Examiner* — Clayton E Laballe
*Assistant Examiner* — Noam Reisner
(74) *Attorney, Agent, or Firm* — Fitzpatrick, Cella, Harper & Scinto

(57) ABSTRACT

A low cost and high speed AF sensor is realized by increasing AF speed without providing a sensor dedicated for a large de-focusing AF. The AF sensor has two sensors each including a plurality of photoelectric conversion elements and detects a focus based on signals read from the sensors. The two sensors each includes a plurality of linear sensors 11 to 13. The two sensors each has a plurality of accumulation controlling circuits (PB detection circuits 14 to 16 and accumulation decision circuits 17 to 19) for controlling the accumulation time of the photoelectric conversion elements and a plurality of scanning circuits (shift registers 21 to 23) for reading out output signals from the photoelectric conversion elements. The AF sensor has a first mode in which the accumulation time of each linear sensor in the two sensors is independently controlled to independently read a signal output and a second mode in which the accumulation time of the linear sensors in the two sensors is collectively controlled to read a signal output.

24 Claims, 9 Drawing Sheets

(56) References Cited

U.S. PATENT DOCUMENTS

2007/0070230 A1 3/2007 Takahashi ..... 348/308
2007/0098389 A1 5/2007 Takahashi ..... 396/121
2008/0240699 A1* 10/2008 Ichimiya et al. ..... 396/96

* cited by examiner (2nd MODE)

(1st MODE)

FOCUS DETECTION APPARATUS, METHOD OF DRIVING THE SAME AND CAMERA SYSTEM

Matter enclosed in heavy brackets [ ] appears in the original patent but forms no part of this reissue specification; matter printed in italics indicates the additions made by reissue.

*This is a reissue of U.S. Pat. No. 7,643,743, issued on Jan. 5, 2010, which is hereby incorporated by reference, as if fully set forth herein. U.S. Pat. No. 7,643,743 matured from U.S. application Ser. No. 11/751,974, filed May 22, 2007.*

BACKGROUND OF THE INVENTION

1. Field of the Invention

The present invention relates to a focus detection apparatus, a method of driving the same and a camera system, and in particular, to an AF sensor for autofocus detection used in a TTL-SIR autofocus digital camera or an analog (silver salt) camera.

2. Description of the Related Art

A TTL-SIR (Through The Lens Secondary Imaged Registration) type of autofocus (hereinafter referred to as AF) sensor in related art was disclosed in Japanese Patent Application Laid-Open No. 2005-300844 by the present applicant. FIG. 9 illustrates a linear sensor arrangement layout of an AF solid-state image sensor for a linear TTL-SIR type of AF in related art. Seven linear sensor pairs 102 are formed over the same semiconductor substrate 101 of the AF sensor corresponding to the ranging points of AF. In addition, a central linear sensor pair 103 is arranged for ranging a central cross. Thus, arranging the linear sensors at the central ranging points in a cross shape in the horizontal and the vertical direction enables cross ranging for a vertical and a horizontal line detection.

Each of the linear sensor pairs 102 and the central linear sensor pair 103 have a linear sensor for an image A (standard portion) 104 and a linear sensor for an image B (reference portion) 105 as a pair of linear sensors respectively. Light beams passing through an imaging lens (not shown) of a camera system are imaged as two objects of the linear sensor for the image A 104 and the linear sensor for the image B 105 on the AF sensor by a secondary imaging optical system (not shown). The phase difference is detected to calculate a de-focusing amount.

The above linear type of AF sensor has a drawback in that a narrow ranging area in a condition where an object is the sky low in a contrast makes it difficult to obtain de-focusing amount at one time, thereby increasing the number of AF computing processes so as to decelerate the AF speed.

FIG. 10 illustrates the layout of the AF sensor for autofocus detection for an area type of TTL-SIR AF in related art. The area type of AF sensor was disclosed in Japanese Patent Application Laid-Open Nos. H11-191867 and 2005-109370 by the present applicant. In the figure, a chip is formed in the same semiconductor substrate by the CMOS process and includes a sensor circuit block 201, analog circuit block 202 and digital circuit block 203. Pixels in area sensors 204, 205, 206 and 207 have photoelectric conversion elements such as photo diodes which are two-dimensionally arranged to form an image pickup area where objects are picked up.

The TTL-SIR type of AF sensor needs an image pickup area for the image A (standard portion) and the image B (reference portion) to detect a phase difference between two objects to be ranged. That is to say, an area sensor 1' (205) is arranged symmetrically with respect to a perpendicular line passing through an optical center 214 (or a sensor center) as the image B opposing the image A of the area sensor 1 (204). In addition, an area sensor 2' (207) is arranged symmetrically with respect to a horizontal line passing through an optical center 214 as the image B opposing the image A of the area sensor 2 (206). In the area sensors 1 and 1', 56 pixel arrays×18 rows are arranged. In the area sensors 2 and 2', 145 pixel arrays×42 columns are arranged.

The analog circuit block 202 includes an auto gain control (AGC) circuit 208 for automatically controlling the gain of a signal output circuit by the accumulation time of the AF sensor, a signal amplifier circuit 209 for amplifying and outputting the photoelectric conversion signal of the AF sensor and a power supply circuit 210 for generating a reference voltage required for driving the sensor. The digital circuit block 203 includes an SRAM 211 for holding accumulation-time data of the AF sensor and gain setting value, a multiplexer circuit 212 for selecting an analog signal and outputting it to a monitor and a timing generator and input/output (I/O) 213.

In the AF sensor for autofocus detection for the above TTL-SIR AF, one line is plurally divided to enable multiple points to be ranged. On the other hand, since each ranging area is narrow, a large de-focusing cannot be focused at one time. This requires AF ranging several times, causing a problem in that AF speed is slow. In particular, the area type of AF sensor is used for AF of multiple ranging points in a wider area, however, cost is increased due to increase in chip area.

In the linear type of AF sensor, there is a limitation in which a line dedicated for large de-focusing is arranged in a predetermined area not to enable multiple points to be ranged. This, however, has the advantage that a chip area is not directly increased. On the other hand, pixels are very densely arranged in the area type of AF sensor, so that chip area is proportionally increased by the area of dedicated lines arranged, increasing cost, which prevents a practical use.

SUMMARY OF THE INVENTION

The present invention has for its purpose to increase AF speed without providing a dedicated sensor for a large de-focusing AF, so as to realize a low cost and high speed AF sensor.

To achieve the above purpose, in the focus detection apparatus of phase difference detection type according to the present invention having two sensors each including a plurality of photoelectric conversion elements and detecting a focus based on signals read out from the sensors, the two sensors each including a plurality of linear sensors, a plurality of accumulation controlling circuits for controlling the accumulation time of the photoelectric conversion elements and a plurality of scanning circuits for reading signals output from the photoelectric conversion elements, the focus detection apparatus is characterized by including: a first driving unit for executing a first mode in which the accumulation time of the linear sensors in each of the two sensors is independently controlled and signals are independently output; and a second driving unit for executing a second mode in which the accumulation time of the plurality of linear sensors in each of the two sensors is collectively controlled and signals are output.

In the present invention, the first driving unit may independently drive the plurality of scanning circuits when executing the first mode, and the second driving unit may sequentially drive the plurality of scanning circuits when executing the second mode. The plurality of accumulation controlling circuits detect the maximum and the minimum value of signals output from a plurality of the photoelectric conversion elements to be arranged and control the accumulation time of the photoelectric conversion elements based on the difference between the maximum and the minimum value to be detected so that the contrast of luminance of object image can be a predetermined value. The plurality of linear sensors may be arranged closely adjacent to each other. The plurality of linear sensors may be arranged so as to align arrangement directions thereof.

The camera system according to the present invention is characterized by including the focus detection apparatus of phase difference detection type described above.

In a method of driving the focus detection apparatus according to the present invention having two sensors each including a plurality of photoelectric conversion elements and detecting a focus based on signals read from the sensors, the two sensors each including a plurality of linear sensors, a plurality of accumulation controlling circuits for controlling the accumulation time of the plurality of linear sensors and a plurality of scanning circuits for reading signals output from the plurality of linear sensors, the method of driving the focus detection apparatus is characterized by including: executing a first mode in which the accumulation time of the linear sensors is independently controlled and signals are independently output; and executing a second mode in which the accumulation time of the plurality of linear sensors is collectively controlled and signals are output.

In the present invention, the executing the first mode may independently drive the plurality of scanning circuits, and the executing the second mode may sequentially drive the plurality of scanning circuits.

According to the present invention, AF speed can be increased without providing a dedicated sensor for a large de-focusing AF to realize a low cost and high speed AF sensor.

Further features of the present invention will become apparent from the following description of exemplary embodiments with reference to the attached drawings.

DESCRIPTION OF THE EMBODIMENTS

The embodiments of a focus detection apparatus, a method of driving the same and a camera system using the same according to the present invention are described below with reference to the drawings.

The focus detection apparatus (hereinafter referred to as AF sensor) according to the present invention uses a phase difference detection type of AF which has two sensors each including a plurality of photoelectric conversion elements arranged and reads the signals from the sensors to detect focal points. Each of the two sensors is formed of a plurality of linear sensors and provided with a plurality of accumulation controlling circuits for controlling the accumulation time of a plurality of linear sensors and a plurality of scanning circuits for reading the signals output from the plurality of linear sensors. This configuration has a plurality of focus detection modes. The present embodiment has a first mode in which the accumulation time of each linear sensor in the two sensors is independently controlled and a signal output is independently read and a second mode in which the accumulation time of the linear sensors in the two sensors is collectively controlled and a signal output is read. In the first mode, the accumulation time of each linear sensor is independently controlled and each scanning circuit independently driven outputs a signal. In the second mode, the accumulation time of a plurality of linear sensors is controlled as if they were one linear sensor and each scanning circuit is sequentially driven to output a signal.

As stated above, in the present embodiment, the same linear sensor has the first and the second mode different in de-focusing area. This enables the first mode to be used for an ordinary AF and the second mode for a large de-focusing AF, thereby increasing AF speed without providing a dedicated sensors for the large de-focusing AF, suppressing increase in chip area, which realizes low-cost and high speed AF sensor.

First Embodiment

Figure 1:
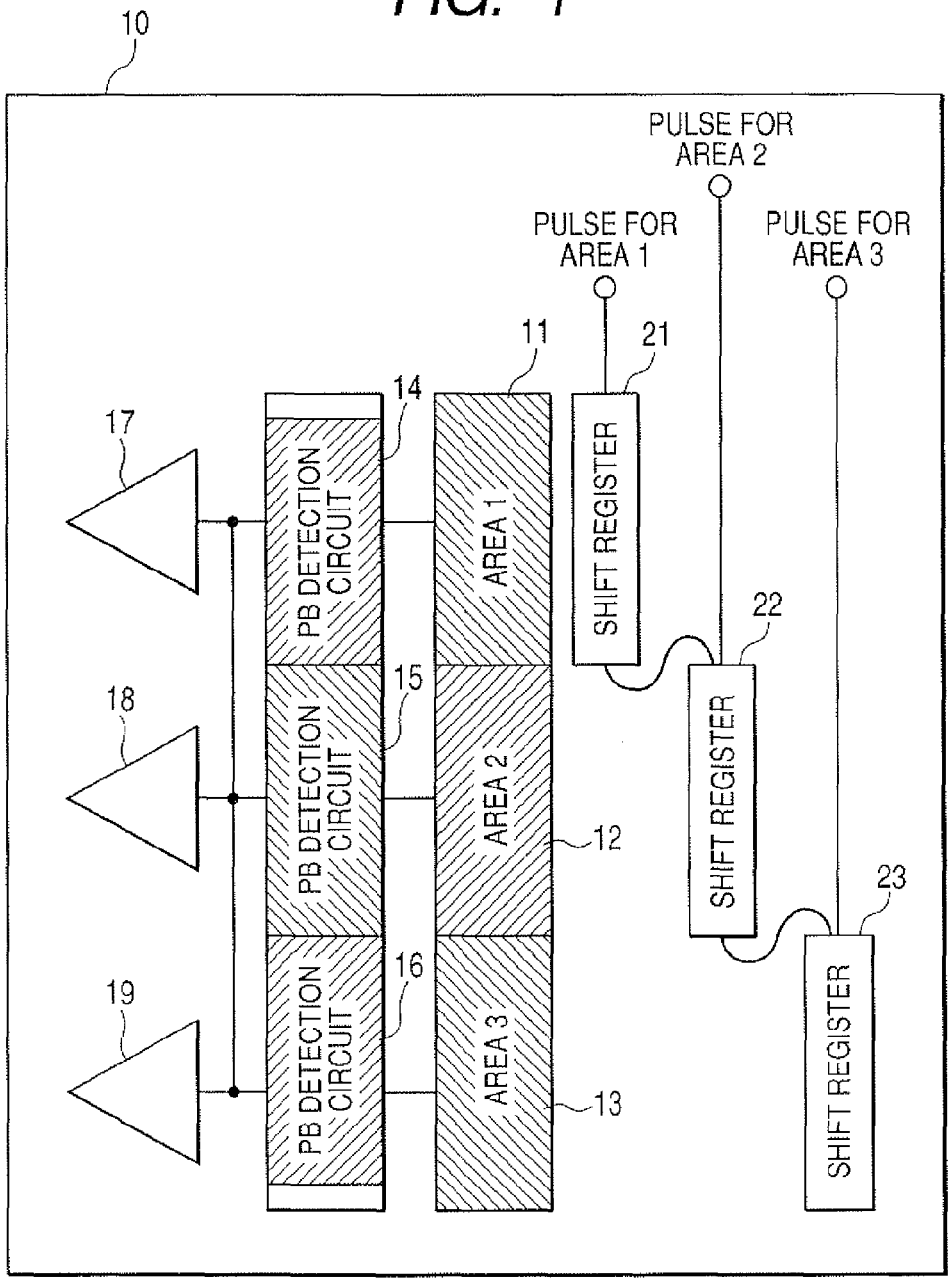
FIG. 1 is a block diagram illustrating the configuration of an AF sensor (focus detection apparatus) according to the first embodiment of the present invention.

FIG. 1 is a schematic diagram describing the AF sensor according to the first embodiment of the present invention.

The AF sensor of the present embodiment illustrated in FIG. 1 uses the TTL-SIR type of AF sensor which has two sensors each including a plurality of photoelectric conversion elements arranged and which reads the signals from the sensors to detect focal points. Since the two sensors are the same in configuration, one out of two sensors is described for the sake of convenience. Three linear sensors 11 to 13 are arranged corresponding to a plurality of areas 1 to 3 (three areas in the figure) for AF over the semiconductor substrate 10 in the sensor. The sensor has circuits including three peak/bottom (PB) detection circuits 14 to 16 for AGC control divided according to the areas 1 to 3 and three accumulation decision circuits 17 to 19 as an accumulation controlling circuit for controlling the accumulation time of the linear sensors 11 to 13. These circuits are arranged over the semiconductor substrate 10. Furthermore, circuits including three shift registers 21 to 23 are arranged as scanning circuits for reading signals output from the linear sensors 11 to 13 over the same semiconductor substrate 10.

The linear sensors 11 to 13 in the areas 1 to 3 are formed of pixels arranged in a straight line which include photoelectric conversion elements such as photo diodes for converting light into electric signals to output signals according to the accumulation amount of the converted optical signals. The three linear sensors 11 to 13 are arranged in a straight line with the arrangement direction of pixels thereof aligned.

The PB detection circuits 14 to 16 are divided to perform AGC control for automatically controlling the gain of the signal output circuit based on the accumulation time of photoelectric conversion elements in the corresponding linear sensors 11 to 13. The portions excluding both sides of the three linear sensors 11 to 13 connected in a straight line in FIG. 1 are used as the PB detection circuits 14 to 16. The maximum and the minimum value detection circuit for detecting the maximum and the minimum value of output of a plurality of photoelectric conversion elements in the linear sensors 11 to 13 are used in the PB detection circuits 14 to 16.

Figure 2:
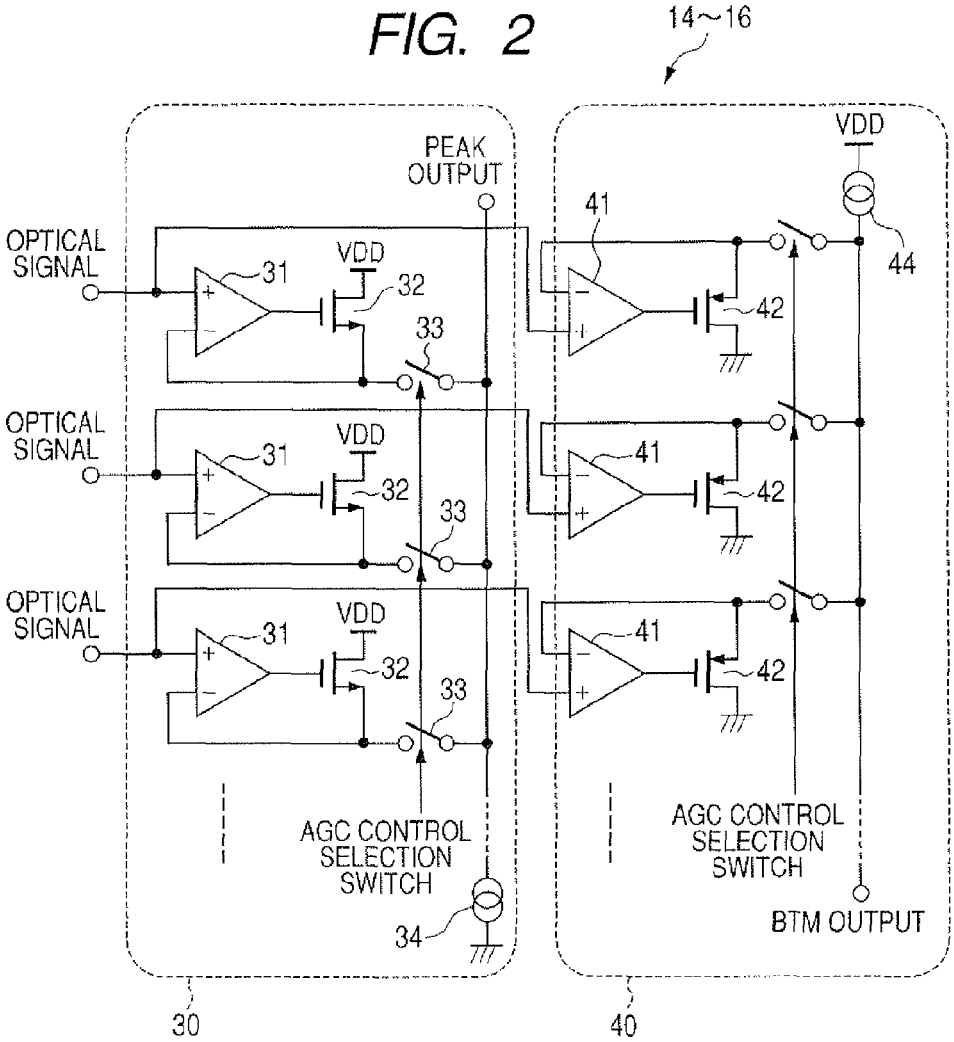
FIG. 2 is a schematic circuit diagram of the maximum and minimum value detection circuit used in a PB detection circuit in the first embodiment.

FIG. 2 is a schematic circuit diagram of the maximum and the minimum value detection circuit used in the PB detection circuits 14 to 16.

In FIG. 2, optical signal converted into electric signal by the electric conversion elements of the linear sensors 11 to 13 are input into corresponding amplifiers 31 in the maximum value detection circuit 30 and corresponding amplifiers 41 in the minimum value detection circuit 40 respectively. In the maximum value detection circuit 30, an NMOS source follower 32 having one constant current source load detects the maximum value of the signal corresponding to the optical signal output from the amplifier 31 and outputs the maximum value as a PEAK output. On the other hand, in the minimum value detection circuit 40, a PMOS source follower 42 having one constant current source load detects the minimum value of the signal corresponding to the optical signal output from the amplifier 41 and outputs the minimum value as a BTM output. An AGC controlled range at this point is an area turned on by AGC control selection switches. The maximum and the minimum value detection signal compared in the selected range are output.

The accumulation decision circuits 17 to 19 control the accumulation time of the linear sensors 11 to 13 based on the difference between the maximum and the minimum value of signal outputs detected by the maximum and the minimum value detection circuit 30 and 40 such that the contrast of luminance of object image can be equal to a predetermined value.

Figure 3:
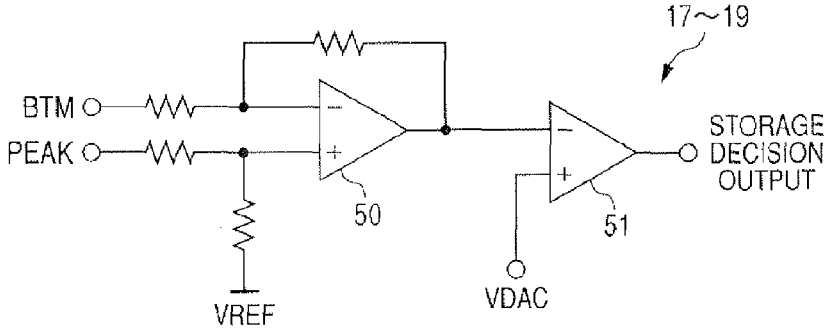
FIG. 3 is a schematic circuit diagram of a accumulation decision circuit in the first embodiment.

FIG. 3 is a schematic circuit diagram of the accumulation decision circuits 17 to 19.

The accumulation decision circuits 17 to 19 illustrated in FIG. 3 receive the maximum value signal as a PEAK value detected by the maximum value detection circuit 30 and the minimum value signal as a BTM value detected by the minimum value detection circuit 40 at the inversion input terminal and the non-inversion input terminal of a differential amplifier 50 respectively. A comparator 51 compares the output signal of the differential amplifier 50 with a constant voltage VDAC set by a digital-to-analog converter (not shown) to determine whether accumulation is terminated and output the decision of accumulation.

The shift registers 21 to 23 are scanning circuits for reading image signals of the line sensors 11 to 13 and formed over the same semiconductor substrate 10 by the CMOS process.

Figure 4:
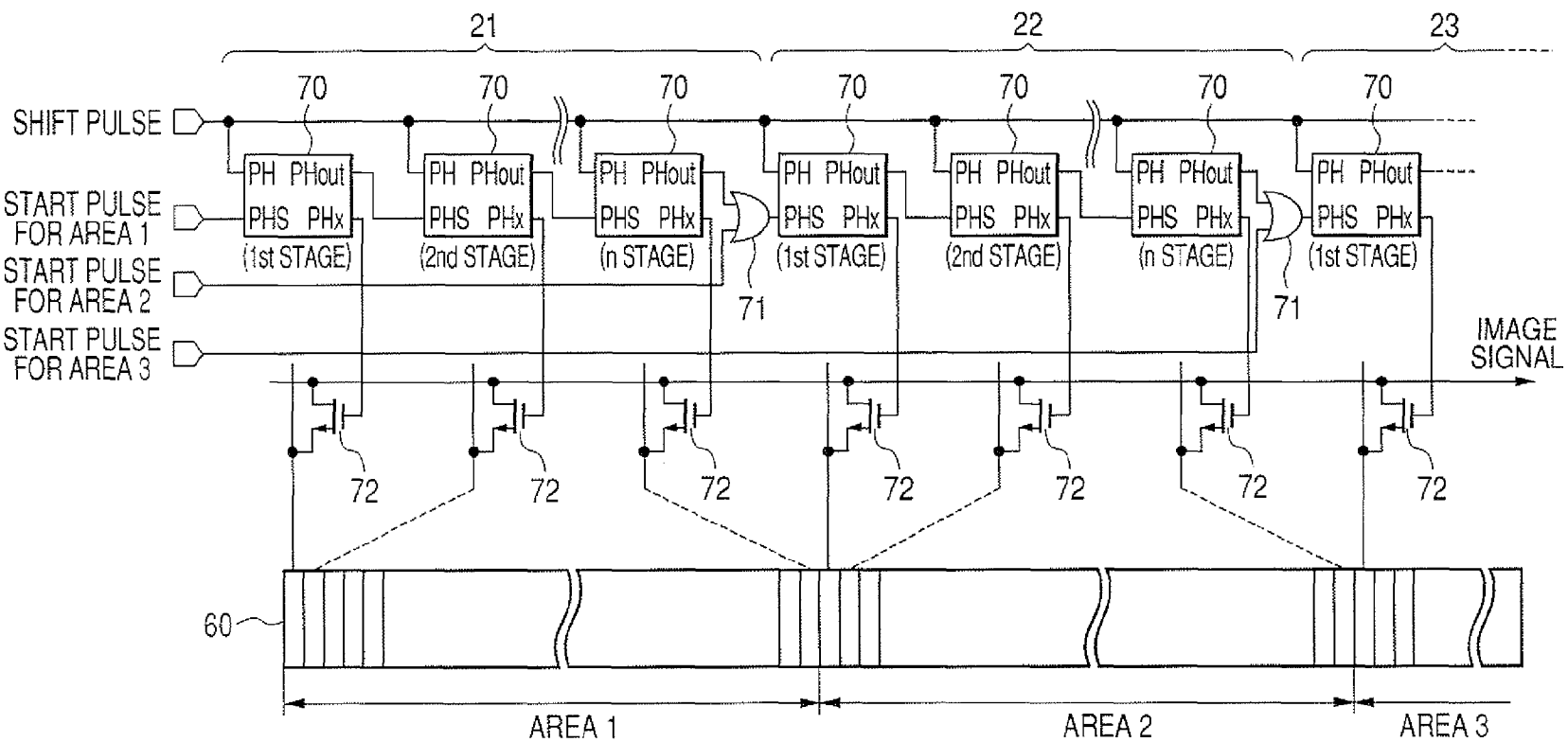
FIG. 4 is a schematic diagram of shift registers in the first embodiment.

FIG. 4 is a circuit diagram of the shift registers 21 to 23.

As illustrated in FIG. 4, the shift registers 21 to 23 include a plurality of stages (n-stages) of flip flops (FF) 70 connected in series. Shift pulses are input into the FFs 70 at each stage thereof in the shift registers 21 to 23. Start pulses for the areas 1, 2 and 3 are independently input into the first stages of the FFs 70 in the shift registers 21 to 23 respectively. Into the FFs 70 at the second to the n-th stage, the signals output from the FFs 70 of the front stage are input. Into the FF 70 at the first stage of the second shift register 22, a logical OR signal between the signal output of the FF 70 of the n-th stage of the first shift register 21 and the start pulse for the area 2 is input through an OR circuit 71. Similarly, into the FF 70 at the first stage of the third shift register 23, a logical OR signal between the signal output of the FF 70 of the n-th stage of the second shift register 22 and the start pulse for the area 3 is input through an OR circuit 71.

The output signals of FFs 70 at each stage thereof in the shift registers 21 to 23 are connected to the gates of transfer MOS transistor switches 72. The transfer MOS transistor switches 72 are connected to line memories 60 disposed in array. Electric signals (image signals) photoelectrically converted by the linear sensors 11 to 13 of the three areas 1 to 3 are stored in the line memory 60. The image signals are output in the horizontal direction by the shift registers 21 to 23 through respective transfer MOS transistor switches 72. The areas 1 to 3 can be independently controlled by the start pulses for the areas 1, 2 and 3 when image signals are read from the shift registers 21 to 23 in the areas 1 to 3.

Figure 5B:
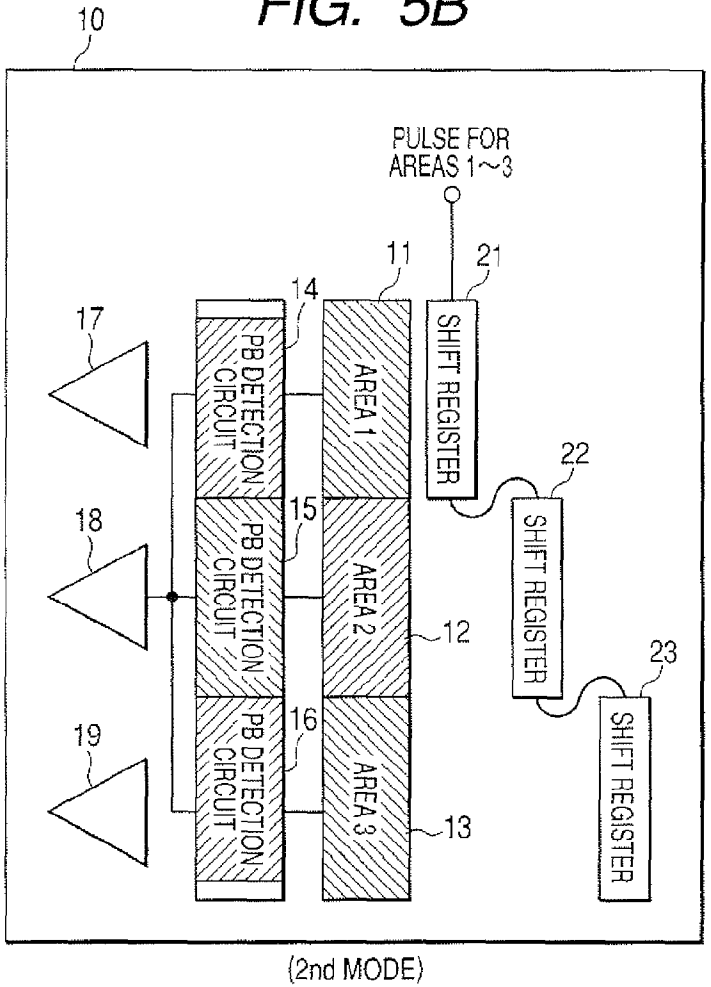
FIG. 5B is a typical diagram illustrating a second mode.

The general operation of the present embodiment is described below with reference to FIGS. 5A and 5B.

Each of the two sensors in the AF sensor in the present embodiment has a first driving mode in which the accumulation time of the linear sensors 11 to 13 is independently controlled and signals are independently output, and a second driving mode in which the accumulation time of the linear sensors 11 to 13 is collectively controlled and signals are output. In the first mode, the accumulation time of the linear sensors 11 to 13 is independently controlled, so that the shift registers 21 to 23 are independently driven to output signals. In the second mode, the accumulation time of the linear sensors 11 to 13 is controlled as if they were one linear sensor, so that the shift registers 21 to 23 are sequentially driven to output signals.

Figure 5A:
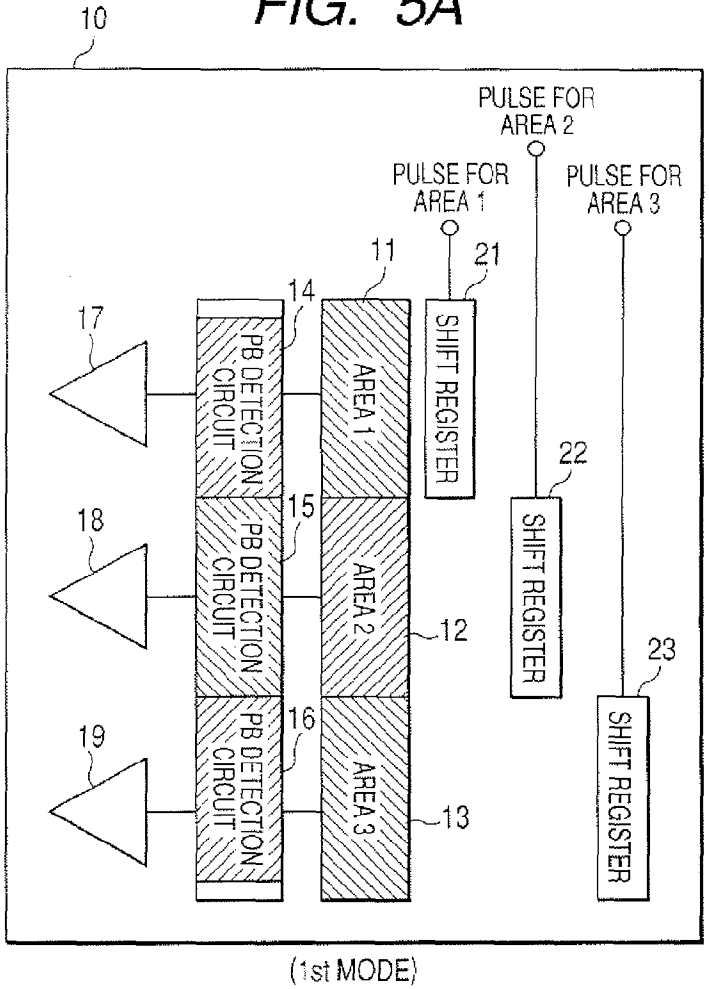
FIG. 5A is a typical diagram illustrating a first mode.

FIG. 5A is a schematic diagram illustrating the first mode. FIG. 5B is a schematic diagram illustrating the second mode.

First, the operation of the first mode is described with reference to FIG. 5A.

Signals photoelectrically converted by storing electric charges generated by light illuminating onto the linear sensor 11 in the area 1 are provided with the range of AGC control by the PB detection circuit 14 to be output to the accumulation decision circuit 17. Accumulation is terminated depending upon the result of determination made by the accumulation decision circuit 17 as to whether accumulation is terminated and then an image signal is read. The image signal of the area 1 is sequentially read in synchronization with the shift pulse by the shift register 21 into which the start pulse for the area 1 is input.

Similarly in the area 2, signals photoelectrically converted by storing electric charges generated by light illuminating onto the linear sensor 12 are provided with the range of AGC control by the PB detection circuit 15 to be output to the accumulation decision circuit 18. Accumulation is terminated depending upon the result of determination made by the accumulation decision circuit 18 as to whether accumulation is terminated and then an image signal is read. The image signal of the area 2 is sequentially read in synchronization with the shift pulse by the shift register 22 into which the start pulse for the area 2 is input. The linear sensors 11 and 12 of the areas 1 and 2 are controlled independently from each other.

Similarly in the area 3, signals photoelectrically converted by storing electric charges generated by light illuminating onto the linear sensor 13 are provided with the range of AGC control by the PB detection circuit 16 to be output to the accumulation decision circuit 19. Accumulation is terminated depending upon the result of determination made by the accumulation decision circuit 19 as to whether accumulation is terminated and then an image signal is read. The image signal of the area 3 is sequentially read in synchronization with the shift pulse by the shift register 23 into which the start pulse for the area 3 is input. The linear sensors 11, 12 and 13 of the areas 1, 2 and 3 are controlled independently from each other.

The operation of the second mode is described with reference to FIG. 5B.

In the second mode, the areas 1 to 3 are treated collectively as one linear sensor. For this reason, the PB detection circuits 14 to 16 divided for each of the areas 1 to 3 are connected with each other. Accumulation is terminated depending upon the result of determination made by the accumulation decision circuit 18 as to whether accumulation is terminated and then an image signal is read. The PB detection circuits 14 to 16 connected together may be connected with the accumulation decision circuits 17 and 19, but the accumulation decision circuits 17 and 19 do not determine as to whether accumulation is terminated. The start pulse for the area 1 is input into the shift register 21 to cause the shift pulse to sequentially drive the linear sensor 11 of the area 1 to the linear sensor 13 of the area 3 to read image signals.

The changeover from the first mode to the second mode and vice versa may be performed based on an operation signal from a console (not shown) such as, for example, a predetermined operation button or switch for AF.

According to the present embodiment as described above, the linear sensors are two-dimensionally arranged closely adjacent to each other, realizing an area type of AF sensor. In addition, the AF sensor has a large de-focusing function and is capable of collectively processing the area divided into three parts in the past, thereby improving AF speed by two times, which realizes a high speed and low cost AF sensor.

That is to say, each of the two sensors forming the AF sensor in the present embodiment has a first mode in which the accumulation time of a plurality of linear sensors is independently controlled and signals are independently output and a second mode in which the accumulation time of a plurality of the linear sensors is collectively controlled and signals are output. This enables the first mode to be used for an ordinary AF and the second mode for a large de-focusing AF. Thus, the same linear sensor has a plurality of modes different in de-focusing area, enabling collectively processing the area divided into three parts in the past without providing a sensor dedicated for a large de-focusing AF. This improves AF speed by two times and realizes a high speed and low cost AF sensor.

Second Embodiment

Figure 6:
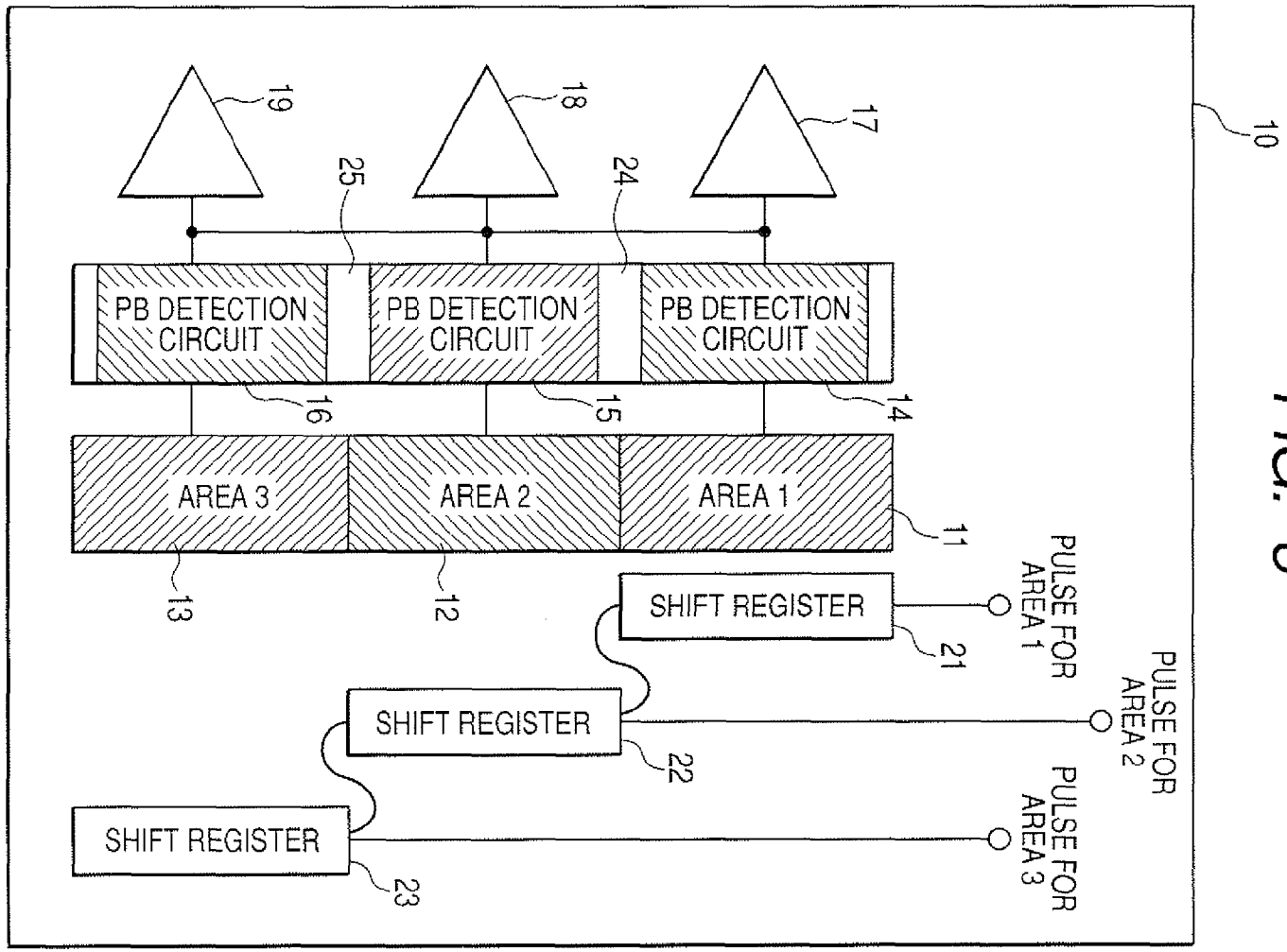
FIG. 6 is a schematic diagram illustrating the configuration of an AF sensor (focus detection apparatus) according to the second embodiment of the present invention.

FIG. 6 is a schematic diagram describing the AF sensor according to the second embodiment of the present invention. The same constituent elements as those in the first embodiment are denoted by the same reference numerals and characters and a description thereof is simplified or omitted.

In the AF sensor of the present embodiment illustrated in FIG. 6, as is the case with the first embodiment, three linear sensors 11 to 13 are arranged corresponding to three areas 1 to 3 over the semiconductor substrate 10. Pixels including photoelectric conversion elements such as photo diodes are arranged in a straight line in the linear sensors 11 to 13. The three linear sensors 11 to 13 are connected to each other in a straight line.

The PB detection circuits 14 to 16 are divided to perform AGC control for automatically controlling the gain of the signal output circuit based on the accumulation time of the linear sensors. The PB detection circuits 14 to 16 are equally divided as illustrated in FIG. 6 to increase computing process speed. An area 24 being space between the areas 1 and 2 and an area 25 being space between the areas 2 and 3 are taken to be an ineffective area and not used for AGC control. The PB detection circuits 14 to 16 detect the maximum and the minimum value in the outputs of a plurality of photoelectric conversion elements according to light intensity. The accumulation decision circuits 17 to 19 control the accumulation time based on the difference between the maximum and the minimum value so that the contrast of luminance of object image can be equal to a predetermined value. The accumulation decision circuits 17 to 19 coincide with those illustrated in the first embodiment in FIG. 2. The shift registers 21 to 23 being scanning circuits for reading image signals are provided on the AF sensor and formed over the same semiconductor substrate 10 by the CMOS process. The shift registers 21 to 23 are the same as those in the first embodiment in FIG. 4.

The general operation of the present embodiment is described below with reference to FIGS. 7A and 7B.

Figure 7B:
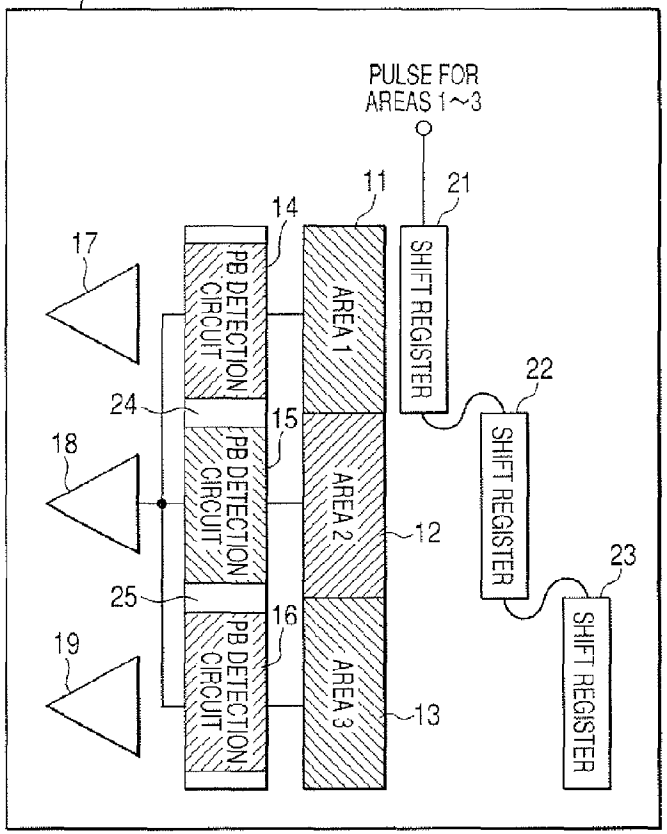
FIG. 7B is a typical diagram illustrating the second mode.
Figure 7A:
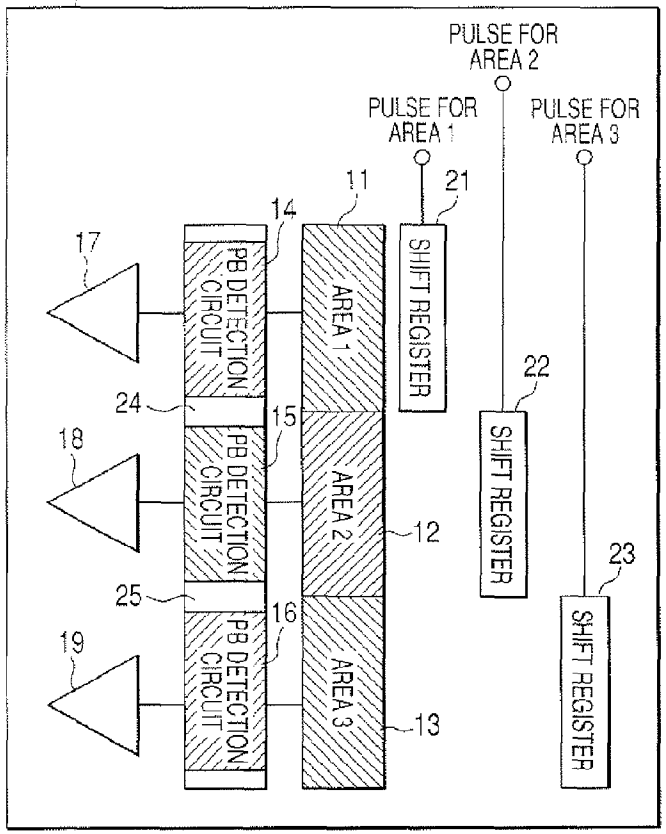
FIG. 7A is a typical diagram illustrating the first mode.

FIG. 7A is a schematic diagram describing the first mode and FIG. 7B is a schematic diagram describing the second mode.

First, the operation of the first mode is described with reference to FIG. 7A.

Signals photoelectrically converted by storing electric charges generated by light illuminating onto the linear sensor 1 in the area 1 are provided with the range of AGC control by the PB detection circuit 14 to be output to the accumulation decision circuit 17. Accumulation is terminated depending upon the result of determination made by the accumulation decision circuit 17 as to whether accumulation is terminated and then an image signal is read. The image signal of the area 1 is sequentially read in synchronization with the shift pulse by the shift register 21 into which the start pulse for the area 1 is input.

Similarly in the area 2, signals photoelectrically converted by storing electric charges generated by light illuminating onto the linear sensor 12 are provided with the range of AGC control by the PB detection circuit 15 to be output to the accumulation decision circuit 18. Accumulation is terminated depending upon the result of determination made by the accumulation decision circuit 18 as to whether accumulation is terminated and then an image signal is read. The image signal of the area 2 is sequentially read in synchronization with the shift pulse by the shift register 22 into which the start pulse for the area 2 is input. The linear sensors 11 and 12 of the areas 1 and 2 are controlled independently from each other.

Similarly in the area 3, signals photoelectrically converted by storing electric charges generated by light illuminating onto the linear sensor 13 are provided with the range of AGC control by the PB detection circuit 16 to be output to the accumulation decision circuit 19. Accumulation is terminated depending upon the result of determination made by the accumulation decision circuit 19 as to whether accumulation is terminated and then an image signal is read. The image signal of the area 3 is sequentially read in synchronization with the shift pulse by the shift register 23 into which the start pulse for the area 3 is input. The linear sensors 11, 12 and 13 of the areas 1, 2 and 3 are controlled independently from each other.

The operation of the second mode is described with reference to FIG. 7B.

In the second mode, the linear sensors 11 to 13 of the areas 1 to 3 are treated collectively as one linear sensor. For this reason, the PB detection circuits 14 to 16 divided for each of the areas 1 to 3 are connected with each other. Accumulation is terminated depending upon the result of determination made by the accumulation decision circuit 18 as to whether accumulation is terminated and then an image signal is read. The PB detection circuits 14 to 16 connected together may be connected with the accumulation decision circuits 17 and 19, but the accumulation decision circuits 17 and 19 do not determine as to whether accumulation is terminated. The start pulse for the area 1 is input into the shift register 21 to cause the shift pulse to sequentially drive the linear sensor 11 of the area 1 to the linear sensor 13 of the area 3 to read image signals.

According to the present embodiment, the linear sensors are two-dimensionally arranged closely adjacent to each other, realizing an area type of AF sensor. In addition, the AF sensor has a large de-focusing function and is capable of collectively processing the area divided into three parts in the past, thereby improving AF speed by two times, which realizes a high speed and low cost AF sensor.

That is to say, each of the two sensors forming the AF sensor in the present embodiment has a first mode in which the accumulation time of a plurality of linear sensors is independently controlled and signals are independently output and a second mode in which the accumulation time of a plurality of the linear sensors is collectively controlled and signals are output. Thus, the same sensor has a plurality of modes different in de-focusing area, enabling collectively processing the area divided into three parts in the past without providing a sensor dedicated for a large de-focusing AF. This improves AF speed by two times and realizes a high speed and low cost AF sensor.

In the present embodiment, the area for AGC control by the PB detection circuits of a plurality of linear sensors is equally divided and the areas being space between the linear sensors are taken to be ineffective areas and not used for AGC control, thereby enabling further increasing processing speed.

Third Embodiment

Figure 8:
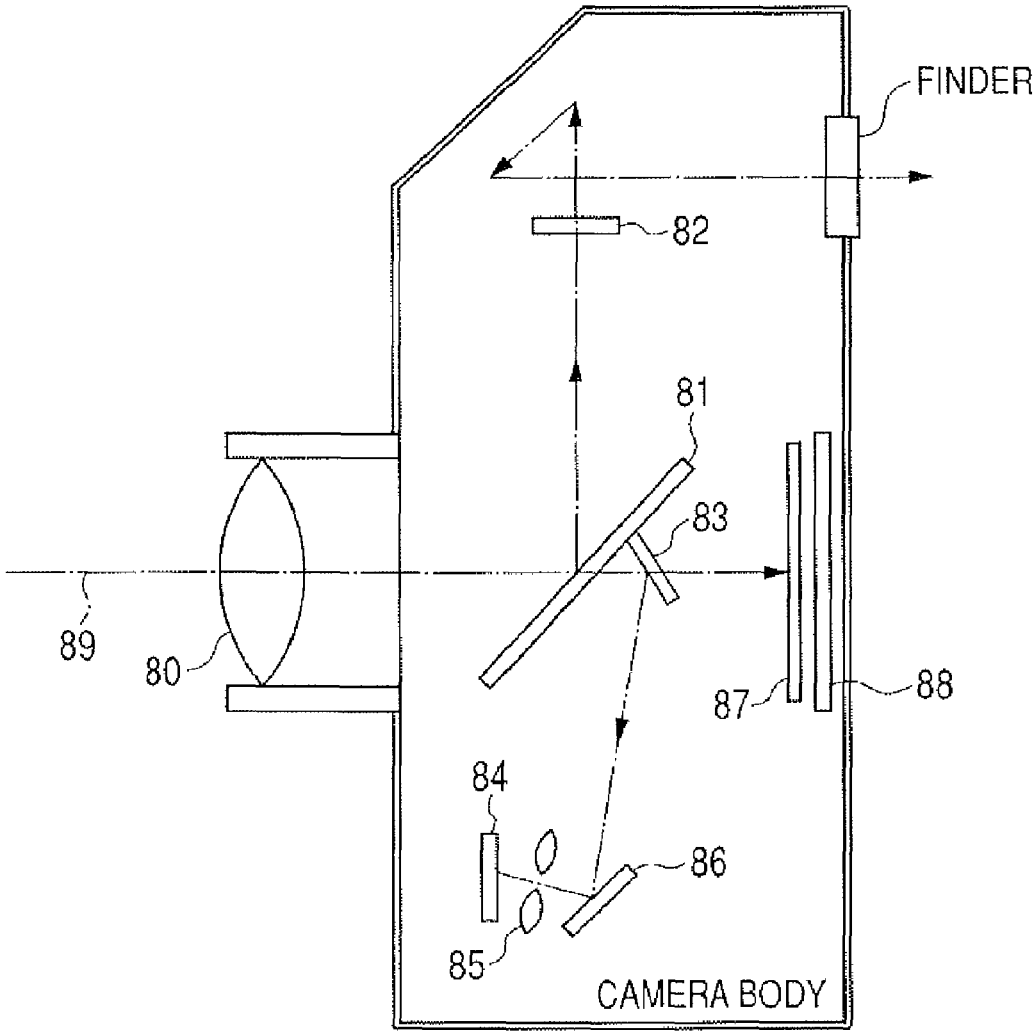
FIG. 8 is a typical diagram illustrating the general configuration of a camera system according to the third embodiment of the present invention.
Figure 9:
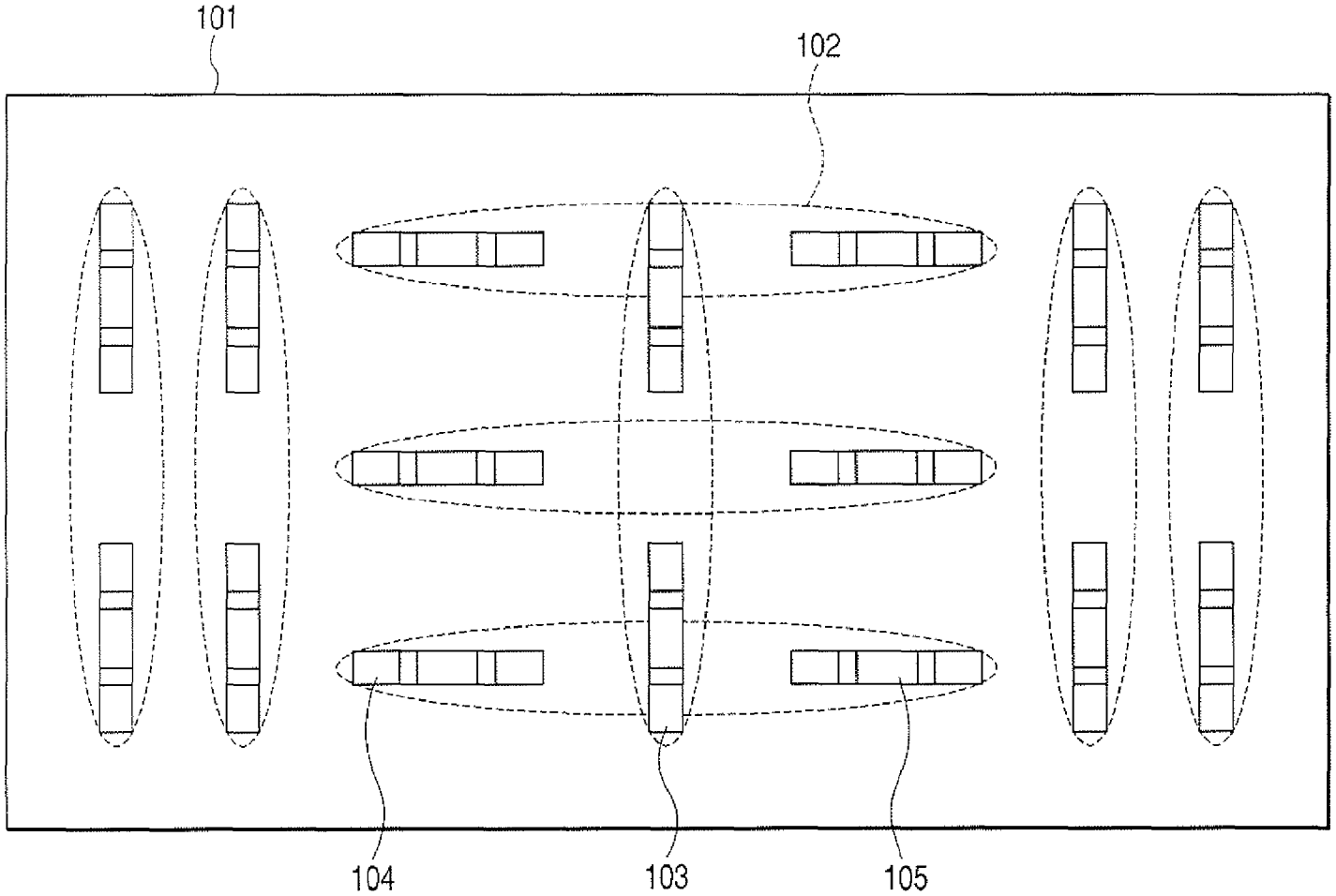
FIG. 9 is a schematic diagram illustrating the configuration of a line type of AF sensor in related art.
Figure 10:
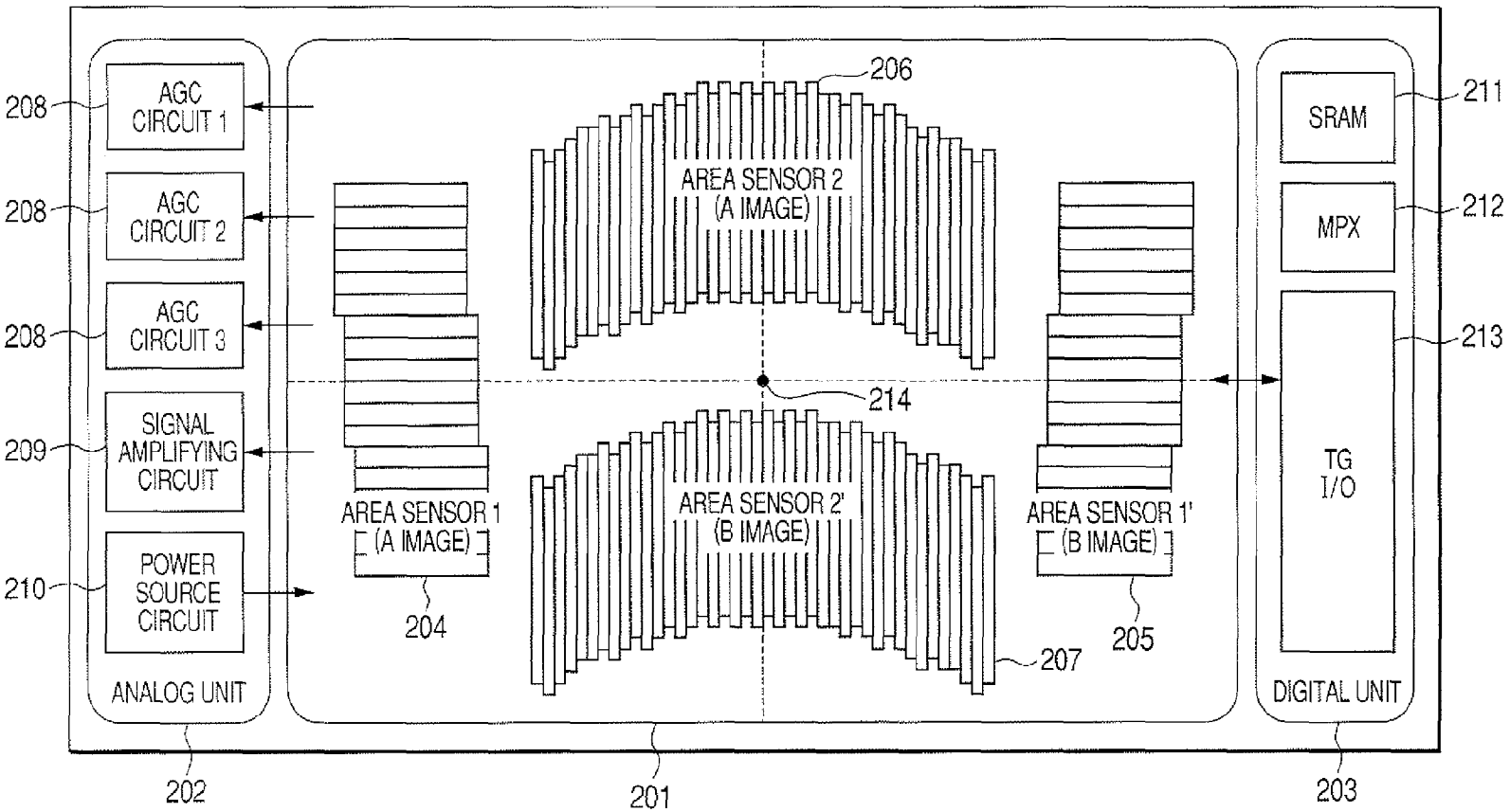
FIG. 10 is a schematic diagram illustrating the configuration of an area type of AF sensor in related art.

FIG. 8 is a schematic diagram illustrating the optical system of a single lens reflex camera with a TTL-SIR type of AF system using the focus detection apparatus according to the present invention. The optical system includes an imaging lens 80 for contemporarily imaging an object image onto a film or image sensor, a quick return mirror 81 being a half mirror transmitting light by several tens of percent for reflecting light to a finder screen 82, a sub-mirror 83 for conducting light to the AF system, an AF sensor 84 mentioned in the above embodiments, a secondary imaging lens (spectacle lens) 85 for imaging again an object image onto the AF sensor 84, a reflective mirror 86 for conducting light to the AF sensor 84, a focal plane shutter 87, film or image sensor 88 and a main axis of light 89.

According to the present embodiment, the use of the AF sensor described in the above embodiments enables achieving a faster focusing speed than a conventional sensor and realizing a low cost single lens reflex camera.

It is to be understood that the present embodiment of the present invention is applicable to a TTL-SIR type of AF camera irrespective of analog or digital camera.

The present invention can be used in a focus detection apparatus and camera system using the same, and in particular, in an AF sensor used in a camera system such as digital or analog TTL-SIR type of AF camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-181670, filed Jun. 30, 2006, which is hereby incorporated by reference herein in its entirety.

What is claimed is:

1. A focus detection apparatus of phase difference detection type having a sensor for a standard portion and a sensor for a reference portion, each of the sensors including a plurality of photoelectric conversion elements, and detecting a focus based on signals read out from the sensor for the standard portion and the sensor for the reference portion, wherein each of the sensor for the standard portion and the sensor for the reference portion includes a plurality of linear sensors, and includes a plurality of accumulation controlling circuits for controlling the accumulation time of the photoelectric conversion elements and a plurality of scanning circuits for reading signals output from the photoelectric conversion elements, and wherein the focus detection apparatus comprises:

a first driving unit for executing a first mode in which the accumulation time of the plurality of linear sensors in each of the sensor for the standard portion and the sensor for the reference portion is independently controlled and signals are independently output; and a second driving unit for executing a second mode such that the accumulation time of the plurality of linear sensors in each of the sensor for the standard portion and the sensor for the reference portion is collectively controlled to read out output signals from the sensors.

2. The focus detection apparatus of phase difference detection type according to claim 1, wherein the first driving unit independently drives the plurality of scanning circuits when executing the first mode, and wherein the second driving unit sequentially drives the plurality of scanning circuits when executing the second mode.

3. The focus detection apparatus of phase difference detection type according to claim 1, wherein the plurality of accumulation controlling circuits detect the maximum and the minimum value of signals output from a plurality of the photoelectric conversion elements to be arranged and control the accumulation time of the photoelectric conversion elements based on the difference between the maximum and the minimum value to be detected so that the contrast of luminance of object image can be a predetermined value.

4. The focus detection apparatus of phase difference detection type according to claim 1, wherein the plurality of linear sensors are arranged closely adjacent to each other.

5. The focus detection apparatus of phase difference detection type according to claim 4, wherein the plurality of linear sensors are arranged so as to align arrangement directions thereof.

6. A camera system comprising the focus detection apparatus of phase difference detection type according to claim 1.

7. A method of driving a focus detection apparatus of phase difference detection type having a sensor for a standard portion and a sensor for a reference portion, each of the sensors including a plurality of photoelectric conversion elements, and detecting a focus based on signals read from the sensor for the standard portion and the sensor for the reference portion, wherein each of the sensor for the standard portion and the sensor for the reference portion includes a plurality of linear sensors, and includes a plurality of accumulation controlling circuits for controlling the accumulation time of the plurality of linear sensors and a plurality of scanning circuits for reading signals output from the plurality of linear sensors, and wherein the method of driving the focus detection apparatus comprises steps of:

executing a first mode in which the accumulation time of the plurality of linear sensors in each of the sensor for the standard portion and the sensor for the reference portion is independently controlled and signals are independently output; and executing a second mode in which the accumulation time of the plurality of linear sensors in each of the sensor for the standard portion and the sensor for the reference portion is collectively controlled to read out output signals from the sensors.

8. The method of driving the focus detection apparatus of phase difference detection type according to claim 7, wherein the executing the first mode independently drives the plurality of scanning circuits, and wherein the executing the second mode sequentially drives the plurality of scanning circuits.

*9. The focus detection apparatus according to claim 1, wherein each of the accumulation controlling circuits comprises:*

*a plurality of peak/bottom detection circuits, wherein each of the peak/bottom detection circuits detects a peak signal or a bottom signal outputted from one of the plurality of photoelectric conversion elements;*

*a plurality of accumulation decision circuits, wherein each of the accumulation decision circuits is adapted to receive a signal from an output node of a corresponding peak/bottom detection circuit and to control an accumulation time of a corresponding photoelectric conversion element in response to the signal from the corresponding peak/bottom detection circuit; and*

*connection means for selectively connecting the output nodes of the plurality of peak/bottom detection circuits with each other electrically, such that one of the plurality of accumulation decision circuits receives the signals from the plurality of peak/bottom detection circuits.*

*10. The focus detection apparatus according to claim 9, wherein, in the first mode, the connection means connects the output node of each of the plurality of peak/bottom detection circuits to a respective one of the accumulation decision circuits.*

*11. The focus detection apparatus according to claim 1, further comprising a plurality of scanning circuits for reading out the signals from the photoelectric conversion elements,*

*wherein each of the scanning circuits comprises multiple-step flip-flops connected in series and, in the first mode, independently receives a start pulse on a scanning circuit basis.*

*12. The focus detection apparatus according to claim 1, further comprising a plurality of scanning circuits for reading out the signals from the photoelectric conversion elements,*

*wherein the plurality of scanning circuits are independently driven in the first mode, and*

*wherein the plurality of scanning circuits are sequentially driven in the second mode.*

*13. The focus detection apparatus according to claim 9, wherein each of the peak/bottom detection circuits comprises:*

*a first amplifier circuit for amplifying the signal from one of the photoelectric conversion elements;*

*an NMOS source follower circuit having a constant current source load and inputted with a signal from the first amplifier circuit;*

*a second amplifier circuit for amplifying the signal from the photoelectric conversion element; and*

*a PMOS source follower circuit having a constant current source load and inputted with a signal from the second amplifier circuit, and*

*wherein one of the accumulation decision circuits determines a difference between an output from the NMOS source follower circuit and an output from the PMOS source follower circuit.*

*14. The method according to claim 7, wherein each of the accumulation controlling circuits comprises:*

*a plurality of peak/bottom detection circuits, wherein each of the peak/bottom detection circuits detects a peak signal or a bottom signal outputted from one of the plurality of photoelectric conversion elements;*

*a plurality of accumulation decision circuits, wherein each of the accumulation decision circuits is adapted to receive a signal from an output node of a corresponding peak/bottom detection circuit and to control an accumulation time of a corresponding photoelectric conversion element in response to the signal from the corresponding peak/bottom detection circuit; and*

*connection means for selectively connecting the output nodes of the plurality of peak/bottom detection circuits with each other electrically, such that one of the plurality of accumulation decision circuits receives the signals from the plurality of peak/bottom detection circuits.*

*15. The method according to claim 14, wherein, in the first mode, the output node of each of the plurality of peak/bottom detection circuits is connected to a respective one of the accumulation decision circuits.*

*16. The method according to claim 15, wherein the focus detection apparatus further comprises a plurality of scanning circuits for reading out the signals from the photoelectric conversion elements, and each of the scan circuits comprises multiple-step flip-flops connected in series,*

*wherein each of the scanning circuits independently receives a start pulse in the first mode.*

*17. The method according to claim 15, wherein the focus detection apparatus further comprises a plurality of scanning circuits for reading out the signals from the photoelectric conversion elements,*

*wherein the plurality of scanning circuits are independently driven in the first mode, and*

*wherein the plurality of scanning circuits are sequentially driven in the second mode.*

*18. A focus detection apparatus having a plurality of sensors each having a plurality of photoelectric conversion elements, the focus detection apparatus comprising:*

*a plurality of peak/bottom detection circuits, wherein each of the peak/bottom detection circuits detects a peak signal or a bottom signal outputted from one of the plurality of photoelectric conversion elements;*

*a plurality of accumulation decision circuits, wherein each of the accumulation decision circuits is adapted to receive a signal from an output node of a corresponding peak/bottom detection circuit and to control an accumulation time of a corresponding photoelectric conversion element in response to the signal from the corresponding peak/bottom detection circuit; and*

*connection means for selectively connecting the output nodes of the plurality of peak/bottom detection circuits with each other electrically, such that one of the plurality of accumulation decision circuits receives the signals from the plurality of peak/bottom detection circuits.*

*19. The focus detection apparatus according to claim 18, wherein the connection means has a mode for connecting the*

*output node of each of the plurality of peak/bottom detection circuits to a respective one of the accumulation decision circuits.*

*20. The focus detection apparatus according to claim 19, further comprising a plurality of scanning circuits for reading out the signals from the photoelectric conversion elements,*

*wherein each of the scanning circuits comprises multiple-step flip-flops connected in series and, in the mode, independently receives a start pulse on a scanning circuit basis.*

*21. The focus detection apparatus according to claim 19, further comprising a plurality of scanning circuits for reading out the signals from the photoelectric conversion elements,*

*wherein the plurality of scanning circuits are independently driven when the mode is executed, and*

*wherein the plurality of scanning circuits are sequentially driven when the output nodes are connected.*

*22. The focus detection apparatus according to claim 18, wherein each of the peak/bottom detection circuits comprises:*

*a first amplifier circuit for amplifying the signal from one of the photoelectric conversion elements;*

*an NMOS source follower circuit having a constant current source load and inputted with a signal from the first amplifier circuit;*

*a second amplifier circuit for amplifying the signal from the photoelectric conversion element; and*

*a PMOS source follower circuit having a constant current source load and inputted with a signal from the second amplifier circuit, and*

*wherein one of the accumulation decision circuits determines a difference between an output from the NMOS source follower circuit and an output from the PMOS source follower circuit.*

*23. The focus detection apparatus according to claim 18, wherein the plurality of photoelectric conversion elements included in each of the plurality of sensors are arranged in a same alignment direction.*

*24. The focus detection apparatus according to claim 18, wherein the plurality of sensors are connected to each other in a straight line, and have ineffective areas between the sensors where the signals from the photoelectric conversion elements are not used for a control of the accumulation time.*

* * * * *